United States Patent Office 2,947,598
Patented Aug. 2, 1960

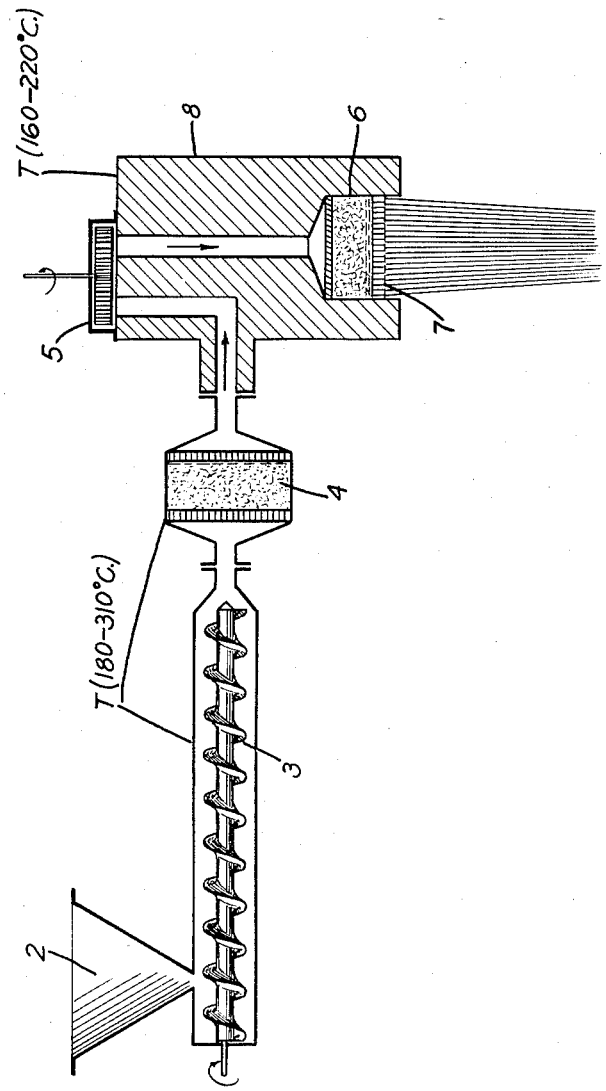

2,947,598

PRODUCING SHAPED ARTICLES COMPRISING ISOTACTIC POLYPROPYLENE

Domenico Maragliano and Franco Denti, both of Villaggio Polymer, Terni, Italy

Filed Aug. 30, 1957, Ser. No. 681,155

Claims priority, application Italy Sept. 5, 1956

10 Claims. (Cl. 18—54)

This invention relates to shaped articles of polypropylene composed of, or containing a predominant proportion of, isotactic macromolecules, and to methods of producing the same. More particularly, the invention is concerned with the melt spinning of isotactic polypropylene to produce filaments and yarns of the polymer.

A wholly new group of crystalline polymers of the alpha-olefines $CH_2=CHR$ where R is a hydrocarbon radical have been described recently by G. Natta and his co-workers. The crystalline polymers are linear, regular head-to-tail polymers consisting substantially of macromolecules in which the tertiary carbon atoms of the main chain have substantially the same steric configuration, and the main chain of which macromolecules, if fully extended in a plane, shows substantially all of the R groups on one side of the plane and all of the hydrogen atoms bound to the tertiary carbon atoms on the opposite side. Polymers made up of macromolecules of this type and shown in the model below have been defined by Natta as "isotactic" polymers and that term has since been adopted by the art: (Model of a portion of the main chain of an isotactic macromolecule of a poly (alpha-olefin) according to Natta et al., arbitrarily fully extended in a plane, in which the R substituents on the tertiary C atoms of adjacent monomeric units are above, and their H atoms are below, the plane of the chain.)

As Natta has shown, the isotactic poly (alpha-olefines) can be obtained by polymerizing the alpha-olefine, with the aid of a catalyst prepared from a compound, e.g., a halide, of a transition metal of Groups IV to VI of the Mendeleeff Periodic Table and a metallorganic compound of a metal of the 1st to 3rd groups of the Periodic Table, the polymerization being carried out in an inert hydrocarbon solvent, at a temperature, e.g., of 50° C. to 120° C., and under atmospheric pressure or only slightly increased pressure.

The isotactic polypropylene thus produced has, normally, a high intrinsic viscosity, i.e. an intrinsic viscosity above 2.0, as determined in tetralin at 135° C.

We find that, for the production of shaped articles from the melt, and more particularly for the production of fibers of the isotactic polypropylene by melt spinning techniques, it is desirable to use the polymer at an average degree of polymerization such that the intrinsic viscosity is between 0.3 and 2.0 (in tetralin at 135° C.).

Under special selected conditions, such as the use of hydrogen pressure during the polymerization, or by variations in the polymerization temperature, it is possible to obtain directly an isotactic polypropylene which has an intrinsic viscosity in the optimum range of 0.3 to 2.0.

Such polymers having the desired intrinsic viscosity can also be obtained by subjecting the isotactic polypropylene having an intrinsic viscosity above 2.0 to a controlled thermal treatment until the average degree of polymerization of the polymer is reduced to a value such that the intrinsic viscosity is in the range of 0.3 to 2.0. Thus, the polypropylene of high intrinsic viscosity may be heated at a temperature 20° C. to 150° C. above the melting point until the intrinsic viscosity has the desired value between 0.3 and 2.0. The polymer can then be melt-spun by cooling the mass so that, at the moment of extrusion thereof, the temperature is between the melting point of the polymer and about 60° C. above the melting point.

If the starting isotactic polypropylene has a viscosity above 2, the heating at the high temperature (20° C. to 150° C. above the melting point) is prolonged until the viscosity is reduced and this usually results in some degradation of the polymer. However, if the starting isotactic polypropylene has the desired intrinsic viscosity between 0.3 and 2, it only has to be heated at the elevated temperature to obtain the melt and to insure homogeneity of the melt, and this can be achieved in a short heating time of the order of 1–5 preferably 4 to 5 minutes. Homogenizing of the melt can also be facilitated by thorough mastication of the mass, which also requires only about 4–5 minutes. Under these conditions, the degradation of the polymer is not appreciable and can be prevented entirely by including a small amount of a heat-stabilizer in the mass.

The present invention is more particularly concerned with the production of shaped articles by melt-extrusion of isotatic polypropylene having an intrinsic viscosity between 0.3 and 2, and specifically with the production of filaments of those polymers by melt spinning.

In practicing the invention, the isotactic polypropylene is either heated at 20° C. to 150° C. above the melting point for a time sufficient to both homogenize the mass and adjust the intrinsic viscosity, and then extruded at the melting point or at a temperature between the melting point and about 60° C. above the melting point, or it is simply heated and homogenized at the elevated temperature and then extruded. However, the procedure of the present method involves a special improvement having to do with filtration of the melt prior to extruding the same.

It has been observed that when the conventional filtration system utilizing a net or sand filter disposed adjacent to the extruder is used with isotactic polypropylene, the spinning pressure increases so rapidly that the extruder must be changed after the extrusion has been in progress for only 10 to 20 hours. The life of the extruder is also shortened due to the fact that small aggregates of the highly crystalline polypropylene tend to persist in the melt and to clog the extruder as the spinning operation proceeds. This complicates continuous commercial scale operations and increases the cost of producing filaments of the polymer.

We find that the last-mentioned difficulties can be avoided by subjecting the molten polymer obtained by the heating at the elevated temperature and while it is in highly fluid condition resulting from such heating to pre-filtration. This pre-filtration of the polymer is additional to the filtration which is performed adjacent to the extruder of the conventional melt-spinning device and after or during cooling the mass as it is extruded. The pre-filtration is effected by inserting a filter of any suitable type, e.g., a net or sand filter, between the zone of the apparatus in which the polymer is heated at the elevated temperature from 20° C. to 150° C. above the melting point, and the zone in which the molten mass is cooled to the melting point or to a temperature between the melting point and about 60° C. above, so that the molten mass is filtered before it is cooled for extrusion, and then again in the usual way just prior to the extrusion. This "pre-filtration" of the molten polymer not only avoids too rapid increase in the pressure at the extrusion point but also removes any clots consisting of aggregates of highly crystalline polypropylene which are not completely melted in the heating stage. This removal of the small clots which exist in the molten mass also helps to prolong the life of the extruder indefinitely so that spinning can be carried out continuously over long periods of time without changing the extruder.

The accompanying drawing illustrates apparatus for carrying out the process of the invention.

In the drawing, 2 represents a hopper discharging into the screw feeder 3, which delivers the polymer to the first filter 4. From filter 4, the polymer is sent, by pump 5, to the filter 6 supported immediately adjacent the spinneret 7 in the housing 8, and then proceeds directly through the orifices of the spinneret. As shown in the drawing, the temperature in the screw feeder and first filter 4 is maintained at between 180° C. and 310° C., and the temperature in the housing containing the second filter and spinneret is maintained at 160° C. to 220° C.

The following examples are given to illustrate the invention and are not intended as limiting.

Example 1

Polypropylenes having an intrinsic viscosity of 1.2 were spun into yarns under the conditions shown below:

| Percent Isotactic | $T_1°$, C. | $T_2°$, C. | $t$ | Spinning Pressure, kg./cm.$^2$ | Characteristics of the yarn | |
|---|---|---|---|---|---|---|
| | | | | | Strength, g./den. | Elongation, Percent |
| 100 | 250 | 200 | 4' | 80 | 6.1 | 19 |
| 89 | 230 | 195 | 4' | 80 | 5.7 | 23 |
| 75 | 220 | 190 | 4' | 75 | 5.0 | 27 |

In the table:
$T_1$ is the temperature of the melted polymer and of first filtration.
$T_2$ is the temperature of second filtration and extrusion.
$t$ is the length of time the polymer was held at the temperature $T_1$.

Example 2

Completely isotactic polypropylenes were spun under the following conditions:

| ($\eta$) of Polymer | $T_1°$, C. | $T_2°$, C. | $t$ | Spinning Pressure, kg./cm.$^2$ | Characteristics of the yarn | | |
|---|---|---|---|---|---|---|---|
| | | | | | ( ) of yarn | Strength, g./den. | Elongation, percent |
| 0.7 | 200 | 170 | 5' | 50 | 0.65 | 5 | 21 |
| 1.2 | 250 | 200 | 5' | 70 | 1.13 | 6.2 | 22 |
| 1.7 | 300 | 220 | 5' | 90 | 1.5 | 6 | 20 |
| 1.4 [1] | 230 | 190 | 5' | 60 | 1.2 | 5 | 25 |
| 1.7 [2] | 260 | 210 | 5' | 80 | 1.5 | 5.6 | 24 |

In the table:
[1] Designates a polymer obtained by heating polypropylene having an intrinsic viscosity of 4.3 at 250° C. for two hours, in the absence of air and of a heat stabilizer.
[2] Designates a polymer obtained by heating a polypropylene of intrinsic viscosity 4.3 at 250° C. for 2 hours in the absence of air but in the presence of 1% of a heat stabilizer.

As has been shown by Natta et al., the crude polymerizate obtained by polymerizing propylene with the aid of the catalysts prepared from compounds of the transition metals of Groups IV to VI of the Periodic Table and the metallorganic compounds such as alkyl aluminum, generally comprises a mixture of the isotactic polypropylene with atactic (non-crystalline) polypropylene. The isotactic polypropylene may be separated from the crude polymerizate by extracting the latter successively with solvents for the polymers having the different steric configurations. As those workers have also disclosed, the polymerization can be oriented to the production of prevailingly to completely isotactic polypropylene by selection of the specific catalyst used, for instance by using a catalyst prepared from a solid, crystalline compound of the transition metal, e.g., titanium trichloride, and the metal alkyl, which catalyst is difficultly dispersible in the inert hydrocarbon solvent used as the polymerization medium.

The polypropylene as produced may be used in practicing this invention provided the proportion of non-crystalline (atactic) polymer mixed with the isotactic polypropylene is not in excess of about 15%.

The proportion of atactic polypropylene present with the isotactic polypropylene in the starting polymer used in the present process for producing shaped articles of the polymer by melt-extrusion methods is restricted to not more than 15% because the atactic polymer has the effect of imparting a somewhat greasy character to the yarns and when the amount thereof present is high, for example when it is about 25%, the yarns obtained tend to be sticky.

In general, it is preferred to use completely isotactic polypropylene (i.e. polypropylene made up of isotactic macromolecules as defined by Natta et al.) in the present process.

Some changes in the details given herein may be made in practicing the invention without departing therefrom and, therefore, it is intended to include in the scope of the appended claims any and all variations which may be apparent to those skilled in the art.

What is claimed is:

1. A process for producing, by melt-extrusion methods, shaped articles of propylene polymers consisting prevailingly of isotactic polypropylene and in which the propylene polymer is melt-extruded at an intrinsic viscosity between 0.3 and 2.0, which process comprises heating isotactic polypropylene having mixed therewith up to 15% of atactic polypropylene at a temperature from 20° C. to 150° C. above the melting point of the isotactic polypropylene to obtain a homogenized molten mass of the polymer having an intrinsic viscosity between 0.3 and 2.0, filtering the molten mass at said temperature above the melting point of the isotactic polypropylene, then cooling the mass to a temperature between the melting point of the isotactic polymer and about 60° C. above the melting point thereof, filtering the cooled mass at the temperature of cooling and immediately extruding the mass, at the temperature of cooling, under pressure through a shaping device.

2. The process according to claim 1, characterized in that the polymer which is heated consists substantially of isotactic polypropylene.

3. A process for producing, by the melt-spinning method, filaments and yarns of propylene polymers consisting prevailingly of isotactic polypropylene and in which the polymer is melt-extruded at an intrinsic viscosity between 0.3 and 2.0, which process comprises heating isotactic polypropylene having mixed therewith up to 15% of atactic polypropylene at a temperature from 20° C. to 150° C. above the melting point of the isotactic polypropylene to obtain a homogenized molten mass of the polymer having an intrinsic viscosity between 0.3 and 2.0, filtering the molten mass at said temperature above the melting point of the isotactic polypropylene, then cooling the mass to a temperature between the melting point of the isotactic polymer and about 60° C. above the melting point thereof, filtering the cooled mass at the temperature of cooling, and extruding the mass, at the temperature of cooling, under pressure through a filament-forming device.

4. The process according to claim 3, characterized in that the polymer heated consists essentially of isotactic polypropylene.

5. A process for producing shaped articles from propylene polymers consisting prevailingly of isotactic polypropylene, containing not more than 15% of atactic polypropylene and having, initially, an intrinsic viscosity above 2.0, which process comprises heating said propylene polymers at a temperature from 20° C. to 150° C. above the melting point of the isotactic polymer until the intrinsic viscosity of said polymer is reduced to a value in the range of 0.3 to 2.0, and a molten homogeneous mass is obtained, filtering the molten mass at said temperature above the melting point of the isotactic polypropylene, then cooling the mass to a temperature between the melting point of the polymer and about 60° C. above the melting point thereof, filtering the cooled mass at the temperature of cooling, and then extruding the mass, at the temperature of cooling, under pressure through a shaping device.

6. The process according to claim 5, characterized in that the cooled mass is extruded through a filament forming device to form filaments.

7. The process according to claim 5, characterized in that the polymer heated consists essentially of isotactic polypropylene.

8. A process for producing shaped articles of propylene polymers consisting prevailing of isotactic polypropylene which process comprises heating isotactic polypropylene containing up to 15% of atactic polypropylene and having an intrinsic viscosity between 0.3 and 2.0, for from one to five minutes at a temperature from 20° C. to 150° C. above the melting point of the isotactic polymer to obtain a molten, homogeneous mass, filtering the molten mass at said temperature above the melting point of the isotactic polypropylene, cooling the filtered mass to a temperature between the melting point of the isotactic polypropylene and about 60° C. above the melting point thereof, filtering the cooled mass at the temperature of cooling, and then extruding the mass, at the temperature of cooling, under pressure through a shaping device.

9. The process according to claim 8, characterized in that the polymer heated consists essentially of isotactic polypropylene.

10. The process according to claim 8, characterized in that the cooled, filtered mass is extruded through a filament forming device to form filaments.

References Cited in the file of this patent

UNITED STATES PATENTS

| | | |
|---|---|---|
| 2,278,875 | Graves | Apr. 7, 1942 |
| 2,367,173 | Martin | Jan. 9, 1945 |
| 2,692,405 | Gayler | Oct. 26, 1954 |
| 2,825,721 | Hogan et al. | Mar. 4, 1958 |

FOREIGN PATENTS

| | | |
|---|---|---|
| 841,485 | Germany | June 16, 1952 |
| 714,330 | Great Britain | Aug. 25, 1954 |

OTHER REFERENCES

Industrial and Engineering Chemistry, July 1956, pp. 1152–1164 relied on.

UNITED STATES PATENT OFFICE

CERTIFICATE OF CORRECTION

Patent No. 2,947,598                                              August 2, 1960

Domenico Maragliano et al.

It is hereby certified that error appears in the above numbered patent requiring correction and that the said Letters Patent should read as corrected below.

In the grant, lines 1, 2 and 3, for "Domenico Maragliano and Franco Denti, of Terni, Italy," read -- Domenico Maragliano and Franco Denti, of Terni, Italy, assignors to Montecatini Societa Generale per l'Industria Mineraria e Chimica, of Milan, Italy, --; line 12, for "Domenico Maragliano and Franco Denti, their heirs" read -- Montecatini Societa Generale per l'Industria Mineraria e Chimica, its successors --; in the heading to the printed specification, lines 4 and 5, for "Domenico Maragliano and Franco Denti, both of Villaggio Polymer, Terni, Italy" read -- Domenico Maragliano and Franco Denti, Terni, Italy, assignors to Montecatini Societa Generale per l'Industria Mineraria e Chimica, Milan, Italy --.

Signed and sealed this 27th day of December 1960.

(SEAL)
Attest:
KARL H. AXLINE                                    ROBERT C. WATSON
Attesting Officer                          Commissioner of Patents